May 2, 1944.  W. SCHACK  2,348,096
MEANS AND METHOD FOR CLAMPING RUNS OF CABLES AND THE LIKE
Filed Feb. 2, 1943  2 Sheets-Sheet 1
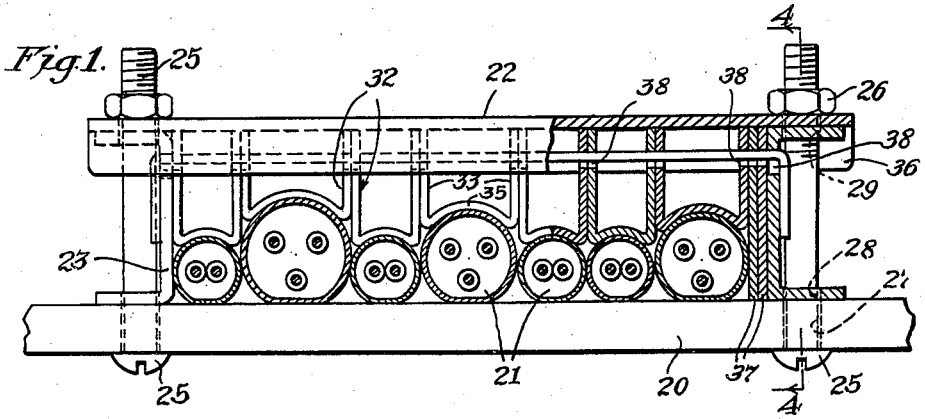
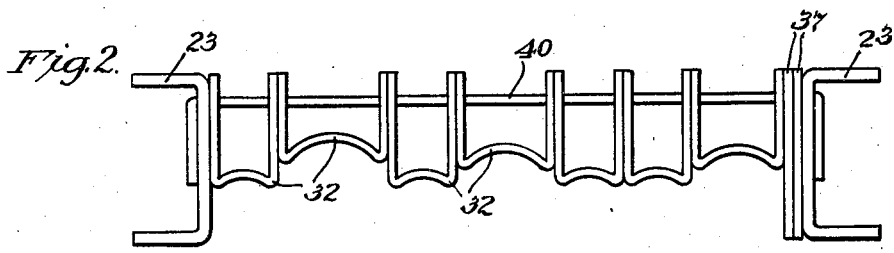
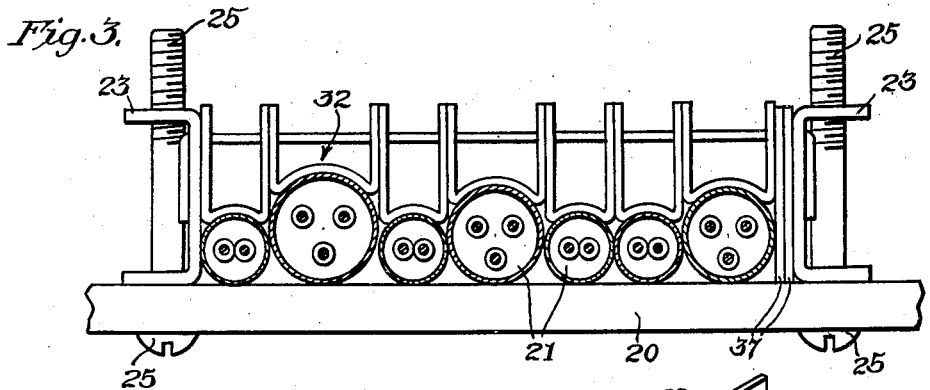
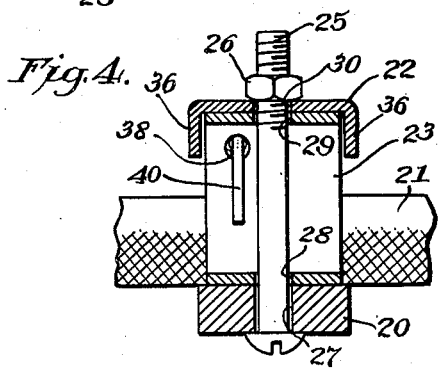
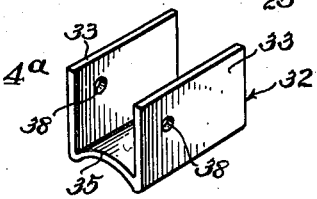
INVENTOR
WILLIAM SCHACK
BY
HARRIS, KIECH, FOSTER & HARRIS,
ATTORNEYS.

May 2, 1944.  W. SCHACK  2,348,096
MEANS AND METHOD FOR CLAMPING RUNS OF CABLES AND THE LIKE
Filed Feb. 2, 1943   2 Sheets-Sheet 2
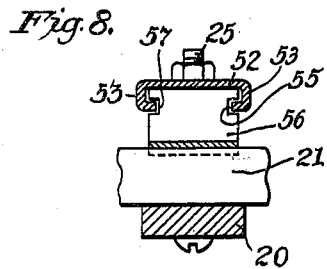
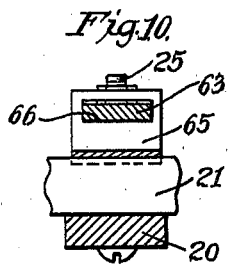
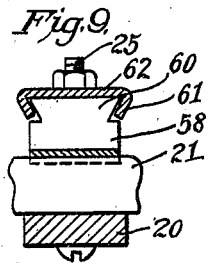
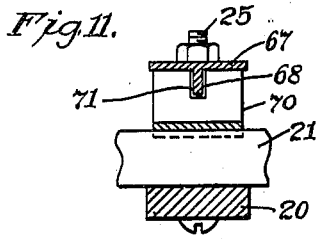
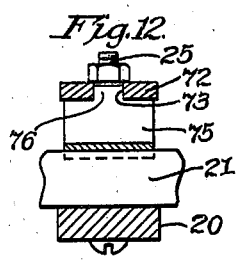
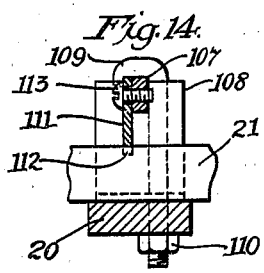
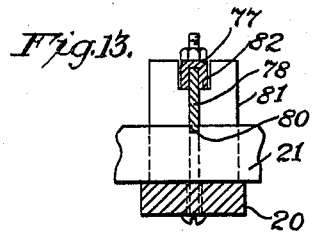
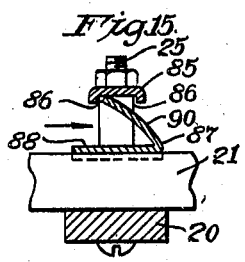
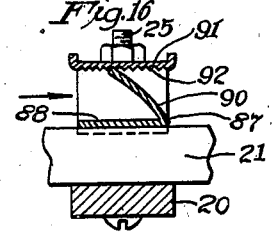
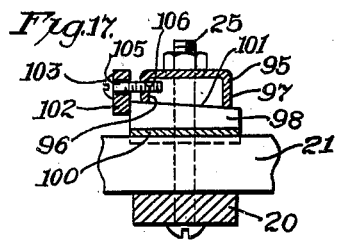
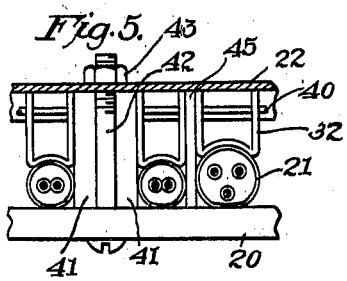
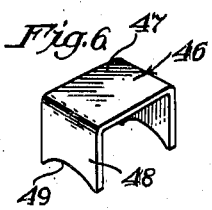
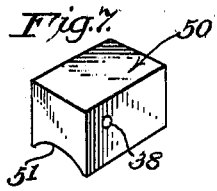
INVENTOR:
WILLIAM SCHACK,
BY
HARRIS, KIECH, FOSTER & HARRIS
FOR THE FIRM
ATTORNEYS.

Patented May 2, 1944

2,348,096

UNITED STATES PATENT OFFICE 2,348,096

MEANS AND METHOD FOR CLAMPING RUNS OF CABLES AND THE LIKE

William Schack, Los Angeles, Calif.

Application February 2, 1943, Serial No. 474,482

13 Claims. (Cl. 248—68)

My invention relates to clamping devices and methods for permanently mounting runs of cables, pipes, and other cylindrical elements on fixed supports or bases. While the invention has utility in many fields, especially in the construction of buildings, aircraft, and vehicles, it is being initially applied to the installation of runs of electric cable in ship construction. For the purpose of disclosure, I elect to describe my invention as embodied in a cable clamp for ship work, such a description being adequate guidance for applying the invention to any other specific purpose.

In present-day ship construction, base members or hangers in the form of flat bars with flanged or up-turned ends are provided to support runs of electric cable, and suitable clamps are mounted thereon to press the cables immovably against the surface of the hanger. In a practice prior to my invention, a workman measures or calipers the cables in a run passing over a particular hanger and sends a tabulation of the sizes to a shop where a second workman sets up a die or metal replica of the cable run, lays a piece of metal strap over the die, and using a hammer and chisel bends the strap into a conforming clamp. The formed clamp is delivered to the job and installed.

Frequently such a clamp does not fit properly, in which event the workman may install it anyway, or may take time to work it over, or may simply throw it away and order another clamp. Such a clamp, even when properly formed and installed, has certain disadvantages when it is considered that the cables must be completely immobilized to prevent destructive friction under the rolling and pitching of a ship at sea. The strap must be thin enough to be formed to required shape by hand and therefore usually lacks the degree of rigidity required for holding a relatively wide run of cable; the degree of pressure against the cables cannot be accurately predetermined and controlled; the pressure exerted is not uniform, lesser pressure against the cables being exerted by the central portion of the clamp; the formed strap does not permit rearranging the cables; and, finally, the strap has very little salvage value, being useless for a second installation.

The general object of my invention is to provide an improved clamping method or procedure and to provide a more efficient clamp. With reference to the construction of the clamp itself, the invention includes the following objects: to provide a strong efficient clamp designed to exert a pre-determined degree of pressure uniformly across a run of cables; to provide a clamp that may aptly be termed universal inasmuch as it is immediately adaptable to any number and combination of diverse cables; to provide a clamp that permits spacing apart the cables of a run and permits convenient rearrangement of the cables after installation if desired; to provide a clamp assembly which need be made in only two sets of sizes to fit cables of all diameters met in ship work; to provide a clamp that involves no loss of material in the event of erroneous information on cable sizes and may be completely salvaged for further use whenever an installation is dismantled; and to provide a clamp that may be manufactured by mass production methods with a single set of dies instead of being made by hand by highly paid workmen on the job.

Objects of my invention relating to the contemplated method or procedure of clamping cables include: to avoid the necessity of writing out preliminary code measurements and sending orders to a shop; to provide a method whereby a clamp may at the point of installation be processed as required for adaptation to any particular combination of random sized cables; to provide in some practices of the invention a clamping procedure involving merely assembly of parts with no cutting, punching or other processing at the point of installation; to provide a rapid installation method that may immediately follow the work of a wiring crew with no delay whatsoever and with no necessity for a subsequent trip by the clamping workman; to provide a method permitting the use of one clamp assembly as a model for use on the spot in making up duplicate assemblies for duplicate installations; and to provide as part of a clamp an assembled subcombination that may be interlocked in advance and added as a unit in the course of installation.

Other objects and advantages of my invention will be apparent in the following description, taken with the accompanying drawings.

In the drawings, which are to be considered as illustrative only,

Fig. 1 is a front elevation partly broken away of the preferred form of my clamp installed to secure a run of diverse cables;

Fig. 2 is a similar view of a sub-assembly of the clamp interlocked for handling as a unit;

Fig. 3 is a similar view of the clamp in process of installation;

Fig. 4 is a transverse section taken as indicated by the line 4—4 of Fig. 1;

Fig. 4A is a perspective view of one of the clamp members;

Fig. 5 is a fragmentary view similar to Fig. 1 showing certain refinements in the preferred practice of the invention;

Figs. 6 and 7 are perspective views of alternative forms of clamp members that may be employed; and Figs. 8 to 17 are transverse sectional views indicating the construction of other forms of the invention that may be employed under my basic concept.

Figs. 1 to 4 depicting the preferred form of my invention show a base member or hanger 20 on which a run of seven cables 21 of diverse sizes is immobilized by the new clamp. The clamp includes a transverse clamp bar 22 in the form of an inverted channel, which bar is mounted in any suitable manner on the base 20 in spaced relation thereto. For example, I may employ support means such as U-shaped clips 23 at each end of the clamp bar and draw the clamp bar against the support clips by the use of suitable screws 25 carrying nuts 26, thereby placing the clips under compression. As best shown in Fig. 4, each of the screws 25 passes through a bore 27 in the base 20, bores 28 and 29 in the corresponding support clip 23, and a bore 30 in the clamp bar 22.

Confined between the clamp bar 22 and the cables 21 is a plurality of clamp members 32, each of which corresponds to one of the cables 21. By correspondence is meant essentially that each of the clamp members 32 is of vertical dimension to combine with one of these cables to occupy the space between the base member 20 and the parallel clamp bar 22, the clamp member being dimensioned to occupy the space under sufficient pressure to immobilize the cable against the base.

The clamp members 32 may take various forms and be manufactured of various materials. In the present construction best shown in Fig. 4A the clamp members are pieces of metal strap bent to form two legs 33 and an interconnecting web portion 35. While the web portion 35 may be of diverse configurations, I prefer a concave configuration approximating the cylindrical configuration of the particular cable size for which the clamp member is designed. Note that the clamp members 32 are confined against lateral movement with respect to the clamp bar 22 by the two side flanges or legs 36 of the clamp bar and are packed together between the two support clips 23 to prevent movement lengthwise of the clamp bar.

In one practice of my invention the workman is supplied with clamp bar stock which he cuts to lengths and punches for screw holes at the time of installation, the workman carrying special cutting and punching tools for final processing of the clamp bar stock. In an alternative practice of the invention, clamp bars 22 are supplied in a variety of graduated lengths pre-punched for immediate use, and the workman merely selects the length appropriate for the width of a particular cable run and fills in with spacers as required. Thus, Figs. 1, 2, and 3 show two spacers 37 in the form of metal plates, which spacers are added to the plurality of clamp members 32 to fill in the lengthwise space between the two support clips 23.

Preferably means is provided whereby at least the plurality of clamp members 32 may be assembled and interconnected in advance for handling as a unit and application as a unit to the run of cables 21 in the clamping procedure. To this end I show in Figs. 1 to 4 a series of aligned bores 38 extending not only through the plurality of clamp members 32, but also through the spacers 37 and the support clips 23, the purpose of the bores being to receive a suitable wire 40. Fig. 2 indicates how appropriate clamp members 32 to conform with a particular run of cables may be selected and arranged in advance together with spacers 37 and support clips 23 and the whole interconnected as a unit simply by passing the wire 40 through the aligned bores 38 and bending down the ends of the wire. The preselection of the clamp members 32 is rendered easy by the fact that said clamp members are of a width equal to that of the cables or cylindrical elements with which they are respectively associated.

Fig. 3 shows the assembly of clamp members of Fig. 2 applied to the run of cables 21 prior to mounting of the clamp bar 22 on the screws 25. Note that the various clamp members 32 when resting on the cables 21 in an unconstrained manner extend slightly above the level of the support clips 23 and spacers 37. Since the degree to which the clamp members 32 extend above the support clips 23 in the absence of the clamp bar 22 determines the degree to which the cables 21 are compressed by tightening down of the clamp bar, the degree of pressure against the cables may be easily predetermined. It is to be noted also that since the channel-shaped clamp bar 22 is a rigid member of considerable strength and since the clamp members 32 may each be dimensioned for a given pressure, substantially uniform pressure on all of the cables 21 may be obtained.

In the preferred practice of my invention, it is contemplated that the workman at the point of application will be provided with a classified assortment of clamp members 32 extending over the whole range of possible cable sizes and will be either provided with graduated sizes of finished clamping bars 22 or with clamp bar stock and suitable tools to process the stock on the spot. With very little practice, the workman may select at a glance the proper clamp member 32 for a given cable size. If there is any error in selecting any particular clamp of an assembly, the error will become apparent as soon as the assembly is applied to the run of clamps in the manner indicated in Fig. 3, since any mismated clamp member 32 will either extend well above or well below the general level of the other clamp members of the series. If a workman has a number of duplicate installations to make, he may organize one of the wired assemblies shown in Fig. 2 and direct a helper to use it as a model for assembling duplicates on the spot.

The purpose of Fig. 5 is to indicate certain refinements that may be made in the above described process of the invention. One of these refinements, is the employment of some intermediate support means for the clamp 22 when an exceptionally long clamp is required for an exceptionally wide run of cables 21. The intermediate support means in Fig. 5 comprises a pair of spacer plates or blocks 41 and an intermediate screw 42 similar to the screws 25, the intermediate screw being provided with a suitable nut 43. Another of these refinements is the use of a spacer 45 to separate two cables in the run.

Figs. 6 and 7 illustrate the fact that the clamp members 32 may take various forms and be fabricated from various materials. The clamp member 46, for example, in Fig. 6 is a U-shaped piece of metal strap having a web portion 47 for engagement with the clamp bar 22 and having two legs 48 with concave ends 49 for pressure contact with the cables. The clamp member 50 of Fig. 7 is a solid block of generally rectangular configuration having a lower face 51 that is cylindrically concave to press against a cable. The clamp member 50 may be made of metal, wood, or plastic.

Figs. 8 to 17 show, by way of example, some of the forms of clamp bars and clamp members that may be employed in various practices of the invention. In most of these forms support clips, like the support clips 23, may be employed at the ends of the clamp bars with, in some cases, suitable modification of the support clip to conform to the configuration of the clamp bar. Screws 25 are shown in most of the figures for cooperation with such support clips, the support clips not being shown in some figures.

In Figs. 8, 9 and 10, the cooperation between the clamp members and the clamp bars is such that the clamp members are confined to movement lengthwise of the clamp bars, there being positive means to prevent the clamp members from dropping away from the clamp bar. Thus, in Fig. 8, the clamp bar 52 is of channel shape with reentrant side flanges or legs 53, thus providing a narrowed lengthwise opening 55 into the channel formed by the clamp bar. Each of the clamp members 56 cooperating with the clamp bar 52 conforms to the cross-sectional shape of the clamp bar in the manner shown, each clamp member having side recesses to receive the inturned end of the clamp bar flanges 53. In Fig. 9, each of the clamp members 58 is cut away to form an upper dovetail 60, and the side flanges 61 of the channel-shaped clamp bar 62 converge for engagement with the dovetail portion 60 of each clamp member. In Fig. 10 the clamp bar 63 is a straight piece of flat stock, and each of the clamp members 65 has a rectangular opening 66 to receive the clamp bar.

Figs. 11 and 12 show constructions that are similar in principle to the preferred form of the invention shown in Figs. 1 to 4 in that each of the clamp members is restrained by the clamp bar against lateral movement in one dimension, but may be dropped away from the clamp bar. In Fig. 11, the clamp bar 67 is T-shaped in cross section with a downward central flange 68, and each of the clamp members 70 has an upper recess 71 conforming to the central flange 68. In Fig. 12 the clamp bar 72 is a piece of flat stock with a central longitudinal slot 73, and each of the clamp members 75 is provided with an upwardly extending tongue 76 to fit into the slot 73.

In the form of my invention shown in Fig. 13, the clamp bar 77 is a narrowed channel member dimensioned to fit snugly over the sides of plates 78 that serve as clamp members, the lower edges 80 of the plates being arcuately cut away for pressure contact with a cable 21. In this particular construction, a support clip at each end of the clamp bar 77 has a notch or upper recess 82 to seat the clamp bar and properly space the clamp bar from the base 20.

Fig. 14 shows a form of my invention in which the clamp bar 107 is a piece of flat stock turned to lie in a vertical plane, the clamp bar resting in a suitable complementary recess in the upper edge of a support clip 108 and being anchored by a hook-shaped screw 109 provided with a nut 110 against the lower face of the base 20. Each of the clamp members 111 for cooperation with the clamp bar 107 is in the form of a flat plate with a lower arcuate edge 112 for pressure contact with a cable 21. In employing this particular clamp, the various clamp members 111 are mounted on one face of the clamp bar 107 by suitable screws 113 before application to the run of cables. The assembly of clamp members 111 and clamp bar 107 is then tightened down against the run of cables by means of the hook-shaped screw 109.

In the forms of the invention shown in Figs. 15 and 16, it is possible to rigidly mount the clamp bar on the two support clips and then insert the clamp members laterally under the clamp bar. Thus, in Fig. 15 I show a clamp bar 85 turned down along its side edges to form longitudinal keeper shoulders 86. Each of the clamp members 87 has a concave wall portion 88 for contact with a cable 21 and has an upwardly inclined flexible tongue 90. After the clamp bar 85 is installed, the clamp members 87 are simply forced laterally under the clamp bar in the direction indicated by the arrow, the tongues 90 flexing downwardly initially and then snapping upward into the space between the two keeper shoulders 86. In the arrangement shown in Fig. 16 I employ the same clamp member 87 and insert the clamp member in the same manner. In this particular form of the invention, however, the clamp bar 91 has a serrated lower surface providing a plurality of longitudinal keeper shoulders 92.

In the particular practice of my invention exemplified by Fig. 17, the retaining pressure against the cables 21 is engendered and controlled by a wedging action. The clamp bar 95 is in the form of an inverted channel having a relatively short side flange 96 and a longer side flange 97. Each clamp member 98, for cooperation with this clamp bar, is in the form of a wedge, the clamp member having a lower concave wall 100 for sliding pressure contact with a cable 21 and having an upper inclined surface or surfaces 101 for wedging contact with the edges of the two side flanges 96 and 97 of the clamp bar 95. Initially, the clamp bar 95 is mounted in final position by screws 25 and suitable support clips, and each of the clamp members 98 is inserted to an initial extent by hand. If any clamp member is of the wrong size, the fact will immediately become apparent. After the various clamp members 98 are inserted by hand, a keeper bar 102 is placed against the outer end of the various clamp members and two or more screws 103 extending through apertures 105 in the keeper bar are threaded into bores 106 in the short flange 96 of the clamp bar 95, the screws being tightened to advance the keeper bar 102 toward the clamp bar and thereby advance the wedge-shaped clamp members 98 until the desired pressure is created on the various cables 21.

It will be apparent how the various clamping devices and clamping methods described above meet the recited objects of my invention. It will also be apparent to those skilled in the art that various modifications and substitutions may be made in carrying out my basic concept, and I reserve the right to all such departures from my specific disclosure that properly lie with the scope of my appended claims.

I claim as my invention:

1. A clamp of the character described for mounting a plurality of cylindrical elements of diverse diameters against a flat base, comprising: a transverse clamp bar; means to connect said clamp bar with said base with at least the major portion of the clamp bar spaced from and substantially parallel to said base; a plurality of separate clamp members corresponding to said plurality of elements for interposition between said clamp bar and said elements, each of said members being dimensioned to occupy under compression the space between the corresponding element and said clamp bar, thereby to press the element immovably against said base; and means to temporarily hold said members together, whereby said members may be organized into an assembly apart from the clamp bar and then moved as a unit into position for final cooperation with the clamp bar.

2. A clamp of the character described for mounting a plurality of cylindrical elements of diverse diameters against a flat base, comprising: a transverse clamp bar providing a guideway lengthwise thereof; means to connect said clamp bar to said base in spaced substantially parallel relation thereto; and a plurality of separate clamp members corresponding to said plurality of elements for interposition between said clamp bar and said elements, each of said members being dimensioned to occupy under compression the space between the corresponding element and said clamp bar, thereby to press the element against said base, each of said clamp members being movable along said guideway and being held thereby against lateral displacement from the clamp bar, each of said clamp members comprising a substantially U-shaped piece of metal strap having a pair of parallel side legs and an interconnecting web at one end thereof.

3. A clamp of the character described for mounting a plurality of cylindrical elements of diverse diameters against a flat base, comprising: a transverse clamp bar forming a channel lengthwise thereof; means to connect said clamp bar to said base in spaced substantially parallel relation thereto; and a plurality of separate clamp members corresponding to said plurality of elements for interposition between said clamp bar and said elements, each of said members being dimensioned to occupy under compression the space between the corresponding element and said clamp bar, thereby to press the element against said base, each of said clamp members being adapted for sliding engagement with said channel, each of said clamp members comprising a substantially U-shaped piece of metal strap having a pair of parallel side legs and an interconnecting web at one end thereof.

4. A clamp of the character described as set forth in claim 3 in which said channel is formed with a narrowed lengthwise opening and said clamp members have portions complementary to said channel, whereby engagement between said members and said clamp bar precludes lateral movement of the members in any direction away from the clamp bar.

5. A clamp of the character described for mounting a plurality of cylindrical elements of diverse diameters against a flat base, comprising: a transverse clamp bar; means to connect said clamp bar to said base in spaced substantially parallel relation thereto; and a plurality of separate clamp members corresponding to said plurality of elements for interposition between said clamp bar and said elements, each of said members being dimensioned to occupy under compression the space between the corresponding element and said clamp bar, thereby to press the element against said base, each of said members being apertured to slidingly embrace said clamp bar.

6. A clamp of the character described for mounting a plurality of cylindrical elements of diverse diameters against a flat base, comprising: a transverse clamp bar; means to connect said clamp bar with said base with at least the major portion of the clamp bar spaced from and substantially parallel to said base; a plurality of separate clamp members corresponding to said plurality of elements for interposition between said clamp bar and said elements, each of said members being dimensioned to occupy under compression the space between the corresponding element and said clamp bar, thereby to press the element immovably against said base, each of said clamp members comprising a substantially U-shaped piece of metal strap having a pair of parallel side legs and an interconnecting web at one end thereof; and means for attaching each of said clamp members to said clamp bar.

7. In a clamp, the combination of: a transverse clamp bar; a plurality of separate clamp members, each of said members including a substantially U-shaped piece of metal strap having a pair of parallel side legs and an interconnecting web at one end thereof; means for maintaining said clamp members in alignment with said clamp bar; and supporting means for supporting said clamp bar, said supporting means being operable to exert pressure on said clamp members through said clamp bar.

8. In a clamp of the character described for mounting a plurality of cylindrical elements against a flat base, the combination of; a transverse clamp bar; means to connect said clamp bar with the base with at least the major portion of said clamp bar spaced from and substantially parallel to the base; a plurality of separate clamp members for interposition between said clamp bar and the cylindrical elements, each of said clamp members having an opening therein parallel to said clamp bar; and a rod element passing through said openings to temporarily assemble said clamp members together into an assembly apart from said transverse bar so that said assembly may be moved as a unit into position for cooperation with said clamp bar.

9. In a clamp of the character described for mounting a plurality of cylindrical elements against a flat base, the combination of: a transverse clamp bar; means to connect said clamp bar with the base with at least the major portion of said clamp bar spaced from and substantially parallel to the base; a plurality of separate clamp members for interposition between said clamp bar and the cylindrical elements, each of said clamp members having an opening therein parallel to said clamp bar, each of said clamp members comprising a U-shaped element formed of a piece of strap metal and having parallel sides connected at one end by a web; and a rod element passing through said openings to temporarily assemble said clamp members together into an assembly apart from said transverse bar so that said assembly may be moved as a unit into position for cooperation with said clamp bar.

10. In a clamp, the combination of: a transverse clamp bar; a plurality of separate clamp members, each of said members including a substantially U-shaped piece of metal strap having a pair of parallel side legs and an interconnecting web at one end thereof; means for maintaining said clamp members in alignment with said clamp bar; base means; and means securing said clamp bar to said base means, operable to exert pressure on said clamp members through said clamp bar.

11. A clamp of the character described for mounting a plurality of cylindrical elements against a base, including: a transverse clamp bar providing a channel lengthwise thereof, said channel having a pair of converging lips; means to connect said clamp bar to said base in spaced relation thereto; and a plurality of separate clamp members, each of said members being adapted to be interposed between said clamp bar and one of said cylindrical elements, each of said members being movable along said channel and being so formed as to be retained in said channel by said lips.

12. A clamp of the character described for mounting a plurality of cylindrical elements against a base, including: a transverse clamp bar providing a channel lengthwise thereof, said channel having at least one inwardly extending lip; means to connect said clamp bar to said base in spaced relation thereto; and a plurality of separate clamp members, each of said members being adapted to be interposed between said clamp bar and one of said cylindrical elements, each of said members being movable along said channel and being so formed as to be retained in said channel by said lip.

13. In a clamp of the character described for mounting a plurality of cylindrical elements against a base, the combination of: a transverse clamp bar; a plurality of separate clamp members, each of said members being of a width substantially equal to the diameter of its corresponding cylindrical element; means for maintaining said clamp members in alignment with said clamp bar; and means for securing said clamp bar relative to the base, operable to exert pressure on said clamp members through said clamp bar to retain the cylindrical elements against the base.

WILLIAM SCHACK.

CERTIFICATE OF CORRECTION.

Patent No. 2,348,096. May 2, 1944.

WILLIAM SCHACK.

It is hereby certified that error appears in the printed specification of the above numbered patent requiring correction as follows: Page 1, second column, line 28, for the word "code" read --cable--; and that the said Letters Patent should be read with this correction therein that the same may conform to the record of the case in the Patent Office.

Signed and sealed this 4th day of July, A. D. 1944.

(Seal)

Leslie Frazer
Acting Commissioner of Patents.